United States Patent [19]
Jaeger et al.

[11] 3,865,564
[45] Feb. 11, 1975

[54] FABRICATION OF GLASS FIBERS FROM PREFORM BY LASERS

[75] Inventors: Raymond Edward Jaeger, Basking Ridge; Walter Logan, Franklin, Somerset County, both of N.J.

[73] Assignee: Bell Telephone Laboratories, Incorporated, Murray Hill, N.J.

[22] Filed: July 9, 1973

[21] Appl. No.: 377,339

[52] U.S. Cl................ 65/2, 65/13, 65/30, 65/32, 65/DIG. 7, 219/121 L, 331/94.5
[51] Int. Cl. ............... C03b 23/04, C03b 37/02
[58] Field of Search........... 65/2, 13, 32, 4, 29, 162, 65/DIG. 7, 30; 219/121 L, 121 LM; 331/94.5

[56] References Cited
UNITED STATES PATENTS

| | | | |
|---|---|---|---|
| 2,652,243 | 3/1972 | Jensen | 65/29 X |
| 2,825,183 | 3/1958 | Riedel | 65/13 |
| 3,217,088 | 11/1965 | Steierman | 219/121 LM |
| 3,415,636 | 12/1968 | Upton | 219/121 LM X |
| 3,737,292 | 5/1973 | Keck et al. | 65/4 X |
| 3,770,936 | 11/1973 | Rively | 219/121 L X |
| 3,792,985 | 2/1974 | Siefert et al. | 65/13 |

Primary Examiner—Robert L. Lindsay, Jr.
Attorney, Agent, or Firm—P. V. D. Wilde

[57] ABSTRACT

Method and apparatus for drawing both clad and unclad fibers of indefinite length from glass preforms are described. A laser beam, generated by a laser operating in the far infrared, is used as a source of heat. In a particular embodiment, a beam of annular cross section is formed and directed substantially around the periphery of the preform.

13 Claims, 5 Drawing Figures

FABRICATION OF GLASS FIBERS FROM PREFORM BY LASERS

BACKGROUND OF THE INVENTION

1. Field of the Invention

The invention relates to a method and apparatus for drawing fibers. More particularly, the invention describes a method and apparatus for drawing glass fibers for use as transmission media in optical communication systems.

2. Description of the Prior Art

The ability to draw long glass fibers having a desired diameter that remains constant for the entire length of the fiber is necessary for low-loss transmission media in optical communication systems. In order to draw a fiber from a preform, a molten zone (or hot zone) is created in the preform from which the fiber is drawn. There are a number of methods by which the end of a glass rod, for example, may be heated to a point where it is soft enough to allow a continuous filament to be drawn from it. Such methods utilize apparatus which include a simple resistance heat element, RF susceptor heat, gas burner, and RF plasma. For example, U.S. Pat. No. 3,652,248 describes a technique for drawing a fiber from a silica preform by heating the rod to a sufficiently high temperature, using several gas jets. A difficulty with this technique is that the fiber produced may be contaminated by impurities from the heating gas. Also, this technique, like the other heating methods mentioned above, generally produces a comparatively long hot zone, which, together with a relative lack of heat control, may lead to (a) vaporization of some of the constituents of the glass rod, (b) phase separation and devitrification, and (c) non-uniform diameter of the fiber.

Such problems are ordinarily of little significance in the commercial production of glass fibers. However, where glass fibers are to be used as low-loss transmission media in optical communication systems, it is essential that the diameter of the fiber remain extremely constant. It is also essential that the hot zone be relatively short in order to avoid any possibility of phase separation and devitrification, which could affect transmission quality.

As a source of heat, lasers are an attractive alternative. A laser beam may be focused and directed by ordinary geometric optics. The beam is non-contaminating, and responds quickly to an input signal. Lasers have been employed in certain specialized heating applications in treating molten glass; see, for example, U.S. Pat. No. 3,514,635, which describes using a laser to vaporize particular impurities, such as $PtO_2$, in molten glass. Lasers have also been used to fabricate single crystal filaments; see NASA Report CR-120948-8DL73235, "Production of Fibers by a Floating Zone Fiber Drawing Technique," May 1972.

SUMMARY OF THE INVENTION

In accordance with the invention, a transmission line for communication in the visible and near-visible wavelengths is provided by heating a glass preform to the molten state and drawing a fiber. A laser operating in the far-infrared, at which the glass preform absorbs a substantial portion of the beam energy, is employed as the heating means. An example of such a laser is the $CO_2$ laser, which produces a beam having a wavelength of 10.6 micrometers. A preferred embodiment is directed to a method and apparatus for producing a laser beam of annular cross section and directing the beam substantially uniformly about the periphery of the preform.

The inventive approach permits the use of highly localized heat, thereby reducing the amount of vaporization and the possibility of phase separation and devitrification. With clad fibers, the inventive approach also reduces interfacial scatter loss. In addition, the dynamic response of the inventive system is sufficiently fast as to make it amenable to automated feedback for control of diameter variations.

The disclosed apparatus may be used for drawing both clad and unclad fibers. The heating procedure is not dependent on any particular atmosphere. Thus, the fiber drawing operation may take place in air, vacuum, inert atmosphere, or reactive atmosphere, as desired by the practitioner.

DETAILED DESCRIPTION OF THE INVENTION

Figure 1:
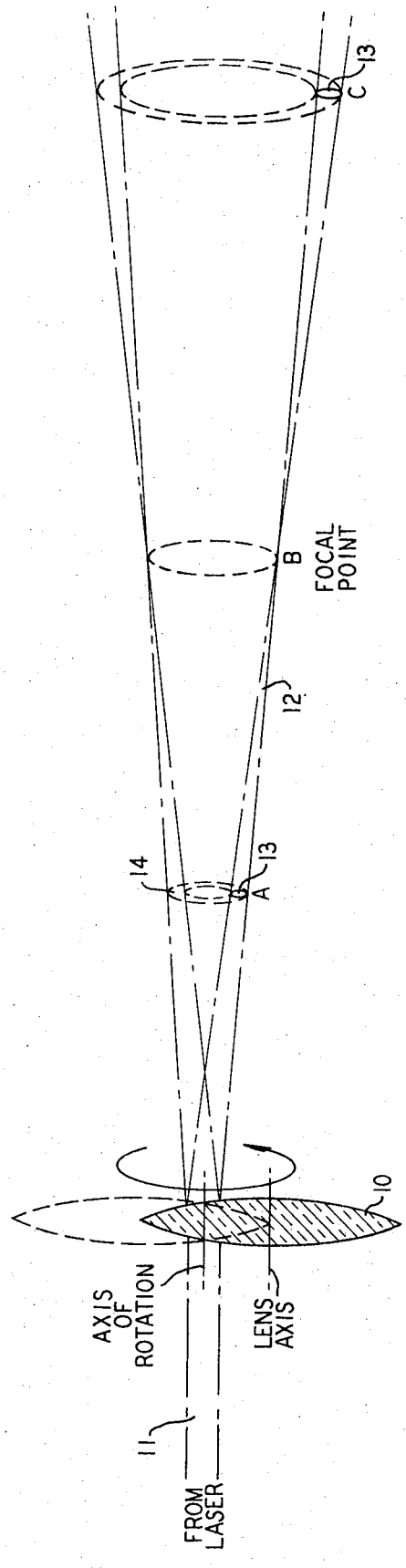
FIG. 1 is a section view showing detail of one type of apparatus used for producing a beam of annular cross section, depicting the beam schematically.

1. Fibers as Transmission Lines For Optical Communication Systems

The inventive method and apparatus are directed toward the fabrication of glass fibers, whether clad or unclad, used as freely supported transmission lines in optical communication systems. Such transmission lines must be capable of transmitting at some desired wavelength in the visible and near-visible wavelength regions with low loss. Fused silica, currently a prime candidate in optical communication systems, exhibits losses in the bulk state of about 2 db per kilometer or less at a wavelength of 1.06 micrometers.

It is generally contemplated that the composition of the glass fibers includes amorphous inorganic oxides, such as fused silica, doped silica compositions, borosilicate compositions, soda-lime-silica compositions, etc. However, the composition of the glass fibers may also include other amorphous materials, such as plastics, which evidence a sufficiently low viscosity at some elevated temperature to permit fibers to be drawn.

2. Heating Means for Fabricating Fibers

The inventive concept contemplates heating a glass blank or preform to at least its softening point with a laser beam and drawing a fiber from the softened blank. The wavelength of the laser beam should be sufficient to heat a glass blank to at least its softening point, which for some systems may be approximately 2,000°C. The glass blank should not be heated by radiant energy of the infrared wavelength approximating that for which the line is designed. Rather, for fused silica or silica-based glasses, for example, far-infrared wavelengths, at which the glass absorbs a substantial amount of the incident energy, are desirably used. A $CO_2$ laser, which generates a beam having a wavelength of 10.6 micrometers, has been found useful.

Since a laser beam is easily focused and directed by ordinary geometric optics, there are several ways in which a laser might be employed to heat a glass. The laser beam may simply be directed at the surface of a glass blank, or, using beam splitting techniques, the laser beam may be made incident on the surface of the blank at at least two diametrically opposed points. To ensure uniform heating of the blank, however, it is preferred that the beam be made incident over substantially the entire periphery of the blank. This may be done, for example, by forming a beam of annular cross section and directing the beam along an axis that is co-linear with the axis of the fiber as it is drawn. Such a beam may then be focused or directed onto the surface of the blank, as described in detail below.

3. Forming a Beam of Annular Cross Section

There are several methods of producing a beam of radiant energy having an annular cross section. For example, a beam having a solid cross section produced by a laser may be directed through an eccentrically mounted rotatable transparent double convex lens. Such a configuration focuses the incident beam at the focal point of the lens, but off the axis of rotation. The transmitted beam has a diameter (or spot size) that varies as a function of distance from the lens. Rotating the eccentrically mounted lens displaces the transmitted spot to trace an annular ring. By rotating the lens at a sufficiently high velocity, a beam is produced which effectively has an annular cross section, the width of the annulus being identical to the spot size. For blank diameters up to 16 millimeters (soda-lime-silica compositions) or 8 millimeters (fused silica), the rotation of the lens must be at least 1,500 revolutions per minute to achieve sufficient uniformity of energy throughout the annular cross section in order to be useful in the practice of the invention.

As shown in FIG. 1, an eccentrically mounted rotating lens 10 transforms a beam 11 of radiant energy having a solid cross section to a beam 12 having an annular cross section, as shown, for example, at point A and again at point C. Point B represents the focal point of the lens. The width of the annulus 14 produced by rotating lens 10 is seen to be equal to the spot size 13 of the transmitted beam for lens 10 in a stationary position.

The lens is mounted on a rotatable holder (not shown), which in turn is rotated, also by means not shown. The lens is ordinarily air-cooled, but may also be water-cooled for improved transmission. The lens must be substantially transparent to the incident radiation (i.e., at least 95 percent of the incident beam should be transmitted). For a wavelength of 10.6 micrometers, gallium arsenide is suitable as the lens material. Silicon and germanium may also be used.

Alternate methods may be employed for transforming a beam of solid cross section into a beam of annular cross section. For example, the use of an axicon lens 20, shown in FIG. 2, results in such a transformation. Gallium arsenide is a suitable material for the lens. Axicon lenses are described elsewhere; see, e.g., Vol. 44, Journal of the Optical Society of America., pp. 592-597 (1954). The outside diameter of beam 12 is controlled by the angle of cone 21 and the distance from the lens to the glass blank to be melted. The width of the annulus 14 of the beam 12 equals the radius of the incident beam 11. If desired, the axicon lens may also be combined with a convex bottom surface to focus the beam, thereby permitting more flexibility in annular width.

Figure 3:
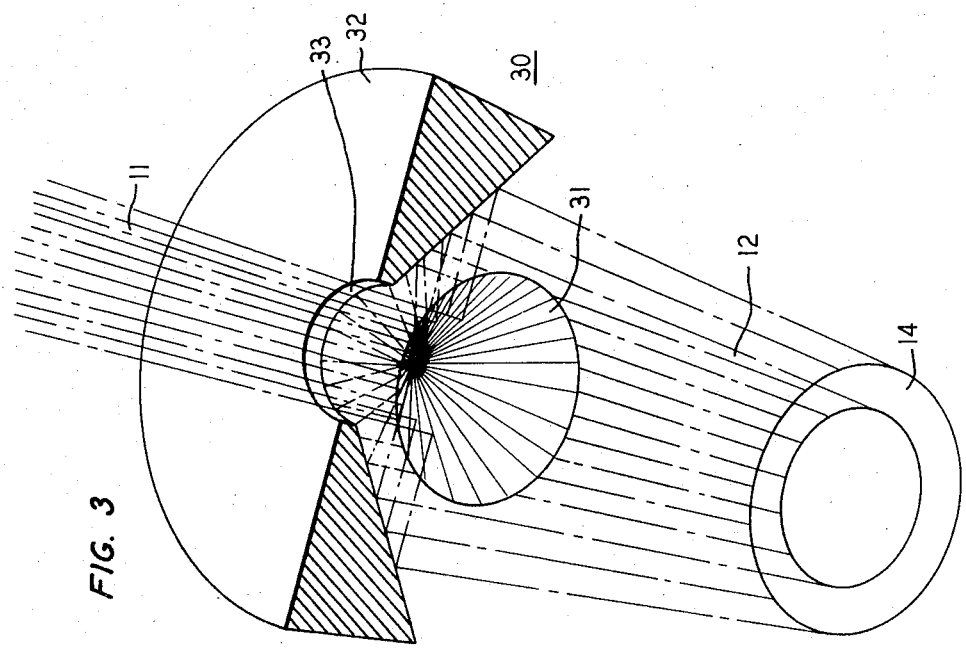
FIG. 3 is a perspective view of reflecting apparatus depicting yet another alternative method for producing a beam of annular cross section.
Figure 2:
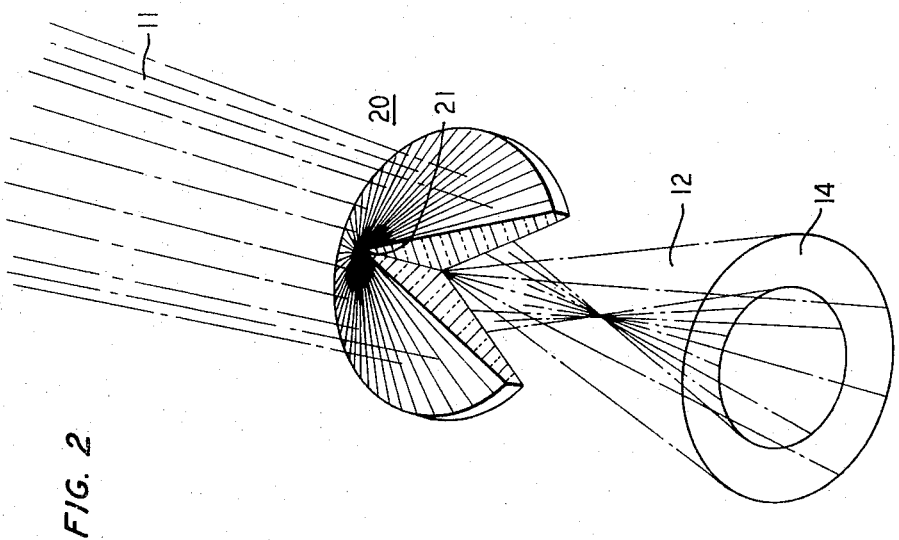
FIG. 2 is a perspective view of transmitting optical apparatus depicting an alternative method for producing a beam of annular cross section.

A beam of annular cross section may also be formed by double reflecting conical apparatus 30, as shown in FIG. 3, which consists of a first reflecting cone 31 surrounded by a second reflecting cone 32 having an aperture 33. Useful reflecting materials include polished aluminum, gold, etc. The outside diameter of beam 12 is dependent on the relative distance between the two cones, and the width of the annulus 14 of the beam is dependent on the relative angular relationship of the surface of the first cone with respect to that of the second cone. Such apparatus as shown in FIGS. 2 and 3 are usually watercooled.

4. Fiber Drawing

It is anticipated that the ratio of the blank diameter to the fiber diameter will range between about 10:1 and 500:1. The ratio is determined by such factors as the blank composition, the blank diameter, the blank feed rate, the desired fiber diameter, the fiber drawing rate, and the laser power level.

The beam of annular cross section is directed uniformly by some means about the periphery of a blank to form a hot zone. Such means may include an apertured conical mirror, a prism, or other suitable optical means. The surface of the optic means may be flat, in which case the beam is simply directed about the periphery of the blank. Alternatively, the surface may be curved, such as paraboloidal or ellipsoidal, in which case the beam is focused.

By controlling the power level of the laser, the beam may be brought to sufficient energy to form a region of sufficient flow in the blank as to enable a fiber to be drawn. The advantage of using a laser as a source of heat is that the hot zone, as approximately represented by the length of the neck-down region, is short and controllable, which is advantageous in reducing the amount of vaporization, the possibility of phase separation and devitrification, and, in the case of clad fibers, the scatter loss at the interface. A relatively short hot zone also enables the fiber to be quenched with a cooling gas as the fiber is drawn from the neck-down region. In the composite glasses, for example, such treatment lowers the refractive index of the glass at the fiber surface.

The length of neck-down region, which is a region of varying diameter between the glass blank and the fiber, must be controlled. If the length of the neck-down region is too short, that is, if the slope of the neck-down region relative to the fiber axis is too high, then it becomes too difficult to draw fibers of constant, controllable diameter, due to flow instability in the neck-down region. On the other hand, for larger lengths (lower slopes), the neck-down region requires an undesirably long hot zone to maintain sufficient softness in the blank to permit fiber drawing. A desirable compromise is to form a hot zone ranging in length from about 50 percent to about 100 percent of the blank diameter.

The fiber as produced is wound on a reel. The reel rotates at a constant and controllable rate, which is an element in maintaining a substantially constant fiber diameter. It is convenient to use a level winding reel to take up the fiber, which moves back and forth across the axis of the fiber. With presently available equipment, it is expedient to use fiber drawing rates ranging about 0.01 meters per second to about 3 meters per second. At lower rates, control of fiber diameter becomes increasingly difficult. There is no actual upper limit on the drawing rate; rather, the upper limit is a function of the speed of the winding reel and the ability to produce sufficient molten feed material in the blank.

5. Fiber Drawing Apparatus

Figure 4:
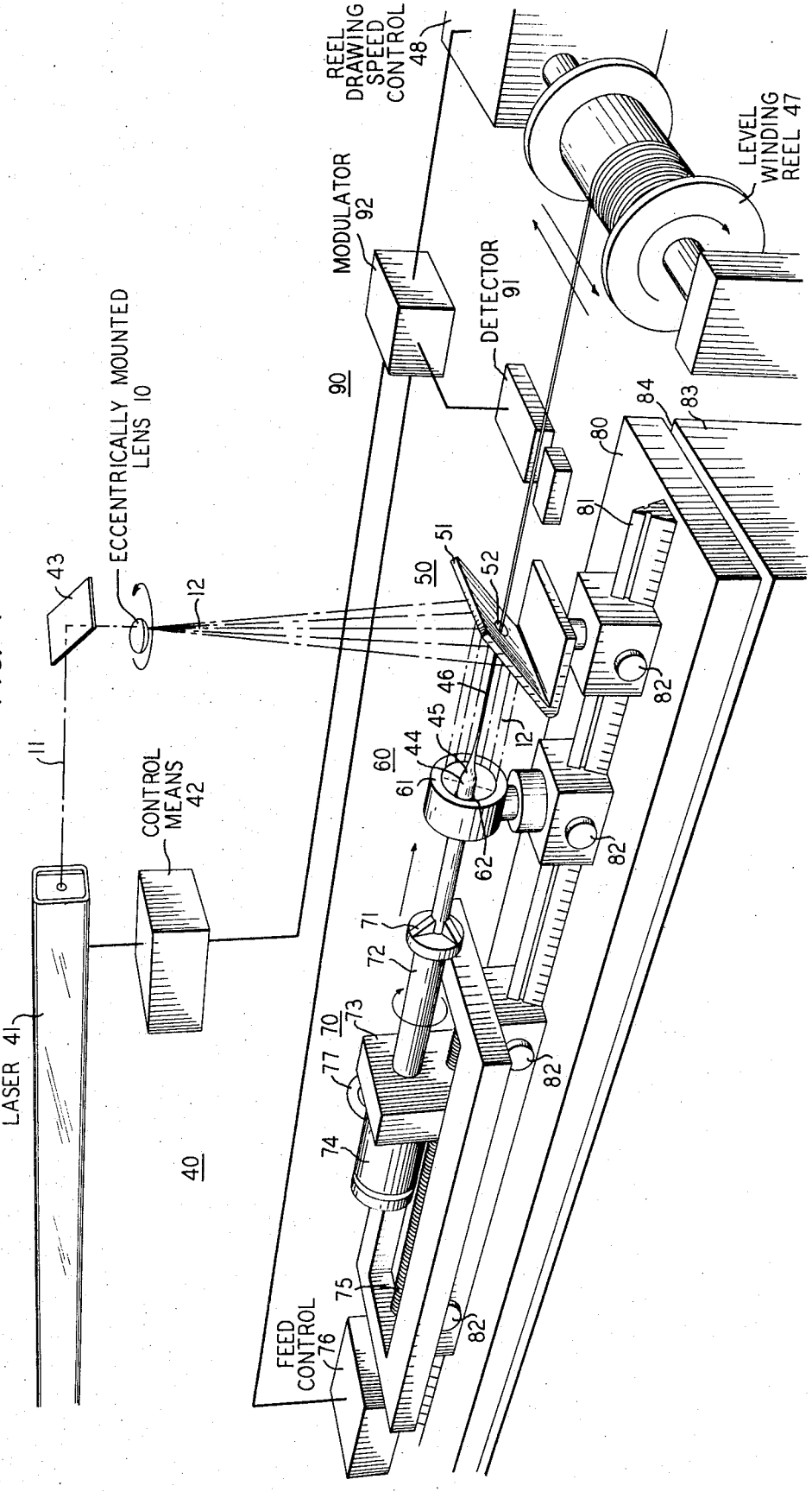
FIG. 4 is a perspective view, partly schematic, of apparatus used in accordance with the invention.

FIG. 4 shows apparatus 40 used in accordance with the invention. A $CO_2$ laser 41, controlled by power supply 42, is used to generate a beam 11 of radiant energy. In the arrangement shown, the $CO_2$ laser is horizontally mounted and a reflector 43 is mounted at an angle of 45° to the axis of the beam to obtain a vertical beam. The surface of the reflector may consist of any highly reflecting material, such as polished aluminum, gold, etc.

In the apparatus shown, an eccentrically mounted transparent double convex lens 10 is rotated, as described earlier, to transform beam 11, having a solid cross section, into beam 12, having an annular cross section. The energy of the beam 12 is thus concentrated in a ring, which impinges upon a reflector assembly 50, comprising a reflector 51 having an aperture 52. The surface of the reflector may again consist of the same material as that of reflector 43, namely, polished aluminum, gold, etc.

Following reflection of beam 12 off the surface of reflector 51, the beam then passes to directing apparatus 60 and is directed substantially uniformly about the periphery of a glass blank 44 to form a hot zone. For purposes of illustration, a mirror 61 having an aperture 62, through which the blank may be advanced into the hot zone, is shown as the directing means. The surface of the mirror may consist of any highly reflecting material, such as polished aluminum, gold, etc.

A fiber 46 is drawn from the forward portion of the blank; a neck-down region 45 is formed during the process. The fiber is wound on a level winding reel 47, controlled by control means 48.

The material comprising the level winding reel may be of almost any material, such as plastic or metal. An aluminum reel is suitable where it is desirable to match temperature coefficients of expansion of the glass fiber and the reel for shipping purposes. Deep-drawn aluminum cylinders are convenient to use as aluminum reels, and are described elsewhere; see, e.g., Mechanical Engineers' Handbook, L. S. Marks, ed., 5th Ed., McGraw-Hill, N. Y. (1951), pp. 1712–1714. The deep drawing process produces drums having a constant and controllable outside diameter.

The opposite end of the blank 44 is secured by a blank holder assembly 70, which consists of a chuck 71 mounted on a spindle 72. The spindle may be rotated by motor 74 in those applications where such rotation is desired. While preliminary work had indicated the usefulness of rotation of the blank in order to ensure uniform temperature about the periphery of the blank, more recent work has shown that optimization of the optics arrangement and sufficiently rapid rotation of lens 10, as discussed earlier, can ensure such uniformity, and thus the blank need not necessarily be rotated. Of course, for fixed lenses such as shown in FIGS. 2 and 3, rotation of the lens is immaterial. The spindle is mounted onto a holder 73 which in turn is mounted onto a precision machined lead screw 75, which advances the forward portion of the blank into the hot zone at a constant and controllable rate. The rate of rotation of the lead screw is controlled by feed control means 76 employing tachometer feedback control, for example.

The reflector assembly 50, the beam-directing assembly 60, and the blank holder assembly 70 are all mounted on an optics bench 80 and are precisely aligned by means of a track 81, to which the three assemblies are attached by screw means 82. In order to minimize shock and vibration, the optics bench is separated from a support table 83 by means of an air cushion 84, generated by means not shown.

Figure 5:
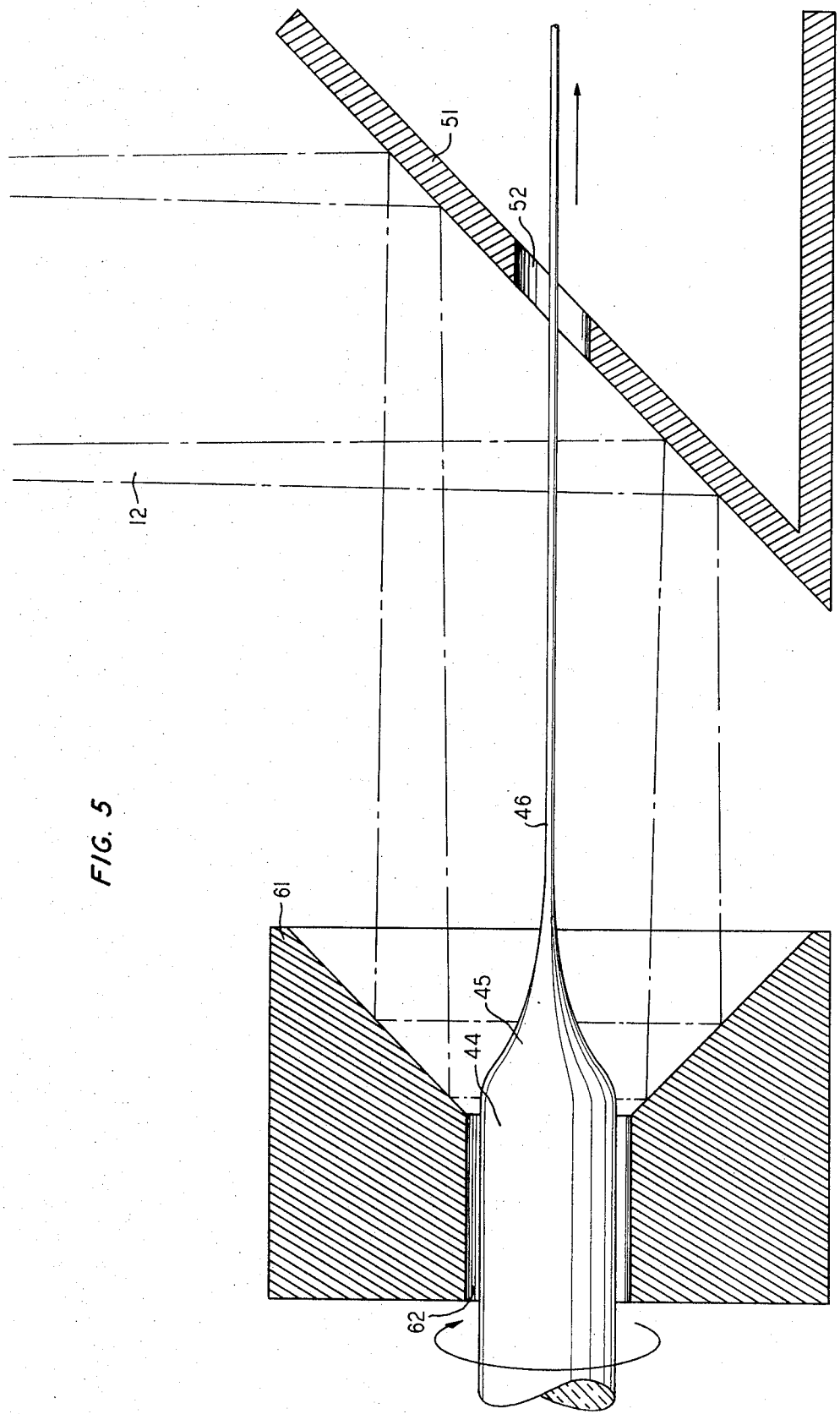
FIG. 5 is a section view showing in detail apparatus such as shown in FIG. 4, depicting the process of drawing a fiber from a preform.

The arrangement as shown and described enables the fiber 46 to be drawn co-extensively along both the axis of blank 44 and the axis of beam 12. The use of beam 12, having an annular cross section, enables the axial drawing to be accomplished while minimizing heating of the fiber once it is drawn, as shown in enlarged detail in FIG. 5. As also shown in FIG. 5, beam 12 is diverging. In the apparatus described, this is a consequence of using a lens 10 having a focal length of 10 centimeters to 25 centimeters, and rotating the lens about an axis which is offset from the lens axis by 0.63 centimeters. While the relationship of the focal point to the optical arrangement is not critical, the location of the lens and hence the focal point is dictated by the desirability of having the width of the annulus within the range of about 50 percent to 100 percent of the blank diameter, as discussed earlier. Alternatively, it would be convenient to use a lens having a considerably longer focal length and placing all the optics on the converging side of the focal point. The advantage of such an arrangement would permit somewhat better control over the hot zone, since the beam would be converging, rather than diverging, on the blank surface.

The description so far has been given in terms of producing an unclad fiber 46 drawn from a solid blank 44, as shown in enlarged detail in FIG. 5. However, the invention may also advantageously be used for drawing a clad fiber consisting of at least one core fiber surrounded by a cladding fiber having a lower refractive index than the core fiber. In such a case, the blank may consist of a rod within a tube. In order to prevent the inclusion of air bubbles along the interface between the core and the cladding fibers and in order to promote a more perfect interface, the spindle 72 may be made hollow in order to enable a vacuum to be drawn through hose 77 by evacuating means (not shown), thereby evacuating the space between outer surface of the rod and the inner surface of the tube.

Alternatively, the core fiber of a clad fiber may simply be a region of different refractive index, which might be achieved, for example, by chemical vapor deposition of a material of different refractive index on the outside of a rod or on the inside of a tube. The apparatus may also be used advantageously to draw other fiber configurations, such as a three-element fiber, consisting of a tube, a solid inner rod, and a supporting plate for the rod, all of the same composition, as described in Vol. 52, Bell System Technical Journal, pp. 265–269 (1973).

The fiber-drawing portion of the apparatus may be isolated from the atmosphere by enclosure in a chamber, in order to permit the fiber-drawing operation to be performed in vacuum, in an inert atmosphere, in a reactive atmosphere, or in an oxygen-containing atmosphere, as desired by the practitioner. Reactive atmospheres might be used to alter the composition of the fiber along its surface, thereby altering the refractive index of the surface layer, resulting in a fiber of two dissimilar regions of refractive indices. Oxygen-containing atmospheres might be used to minimize loss of glass constituents due to vaporization at the high temperatures of fiber drawing. Introduction of beam 12 into such a chamber may be accomplished by use of a window of gallium arsenide or other suitable material.

One of the advantages of using a laser as a source of heat is that the laser exhibits fast response to an input signal. As a result, a feedback system may be designed which controls the power output of laser 41, the velocity at which blank 44 is advanced into the hot zone, and the velocity at which fiber 46 is drawn. Such a detection system is shown in FIG. 4. The detector system 90 comprises a detector 91, and a modulator 92. The detector, which is mounted immediately following the emergence of fiber 46 from the reflector assembly 50, senses any changes in fiber diameter. Such sensing may be done by a variety of techniques, all of which are well-known in the art of detecting such changes. In response to a change in fiber diameter, a signal is sent to modulator 92, which adjusts the power output of the laser, thereby either increasing or decreasing the temperature at the periphery of the blank, as desired. The modulator may also adjust the reel drawing speed control 48, thereby altering the rate of fiber drawing and hence the fiber diameter. Alternatively, the modulator could adjust the feed control 76, which in turn, affects the rate at which the blank is introduced into the hot zone, thereby again altering the rate of pulling of the fiber. Thus, any changes in diameter that occur may be sensed almost immediately from the time of fiber formation and may be corrected immediately.

6. Examples

Several fibers having a length of approximately 1,200 meters have been drawn using the inventive method and apparatus. A fiber drawing rate of about 0.5 meters per second has been typically used. The blank diameters are typically 5 millimeters to 15 millimeters, and the diameters of the resultant fibers have ranged from 0.1 millimeters to 0.25 millimeters. At the present stage, variations in fiber diameter of less than 1 percent have been achieved.

A. Unclad fused silica fibers, ranging from about 0.1 millimeters to about 0.18 millimeters in diameter, have been drawn at laser power levels ranging from 90 watts (for a blank diameter of 2 millimeters) to 310 watts (for a blank diameter of 8 millimeters). The measured loss at a wavelength of 1.12 micrometers was 7 $db$ per kilometer, which was identical to the loss measured in the bulk glass.

B. Unclad soda-lime-silica fibers, having about the same diameter range as in Example (A), have been drawn at laser power levels ranging from 40 watts (for a blank diameter of 6.4 millimeters) to 90 watts (for a blank diameter of 14 millimeters). The measured loss at a wavelength of 0.63 micrometers was about 68 $db$ per kilometer, which was identical to the loss measured in the bulk glass.

C. Clad fibers consisting of a core of titanium-doped silica clad with pure fused silica have been drawn from a blank assembly comprising a 3 millimeter rod and a tube having a 4 millimeter inside diameter (ID) and a 7 millimeter OD. The laser power level was about 175 watts, and the resulting fiber was about 0.15 millimeters in diameter. The total loss, measured at 0.63 micrometers, was 30 $db$ per kilometer, and included a scatter loss of 10 $db$ per kilometer.

D. Clad fibers have been drawn consisting of a core of silica clad with fused silica, in which a borosilicate layer had been chemically vapor deposited in the inside of the fused silica tube prior to drawing. The blank assemblies comprised rods ranging from 0.5 millimeters to 1 millimeter in diameter, and tubes ranging from 1 millimeter to 1.5 millimeters ID and 5.5 millimeters to 6 millimeters OD. The fibers were drawn at a laser power level of about 180 watts, and ranged in diameter from about 0.12 millimeters to 0.2 millimeters. The total loss, (absorption plus scatter) measured at 0.7 micrometers, was 13 $db$ per kilometer.

E. Clad fibers have been drawn consisting of a core of soda-lime-silica clad with soda-lime-silica having a refractive index 1.33 percent less than the core composition. The blank assembly comprised a rod having a diameter of 6.5 millimeters and a tube having an 8 millimeter ID and a 14 millimeter OD. The laser power was about 95 watts and the resulting fiber was about 0.2 millimeters in diameter. The interfacial scatter loss introduced in the drawing process ranged from 0 $db$ per kilometer to 10 $db$ per kilometer in the spectral region between 0.5 micrometers and 1 micrometer.

What is claimed is:

1. A method for drawing a glass fiber from a preform comprising the steps of:
    forming a hot zone,
    exposing at least a portion of the preform to the hot zone to raise its temperature to at least the softening point,
    drawing a glass fiber from the softened portion of the preform,
    the method characterized in that the hot zone is produced by means of a laser beam and the laser beam is introduced into the region of the hot zone with an approximately annular cross section and in a direction that is approximately colinear with the direction along which the fiber is being drawn.

2. The method of claim 1 in which the annular laser beam is directed onto the preform by an approximately conical reflector.

3. The method of claim 1 in which the laser beam is generated by a $CO_2$ laser.

4. The method of claim 1 in which the fiber is drawn in a vacuum.

5. The method of claim 1 in which the fiber is drawn in an inert atmosphere.

6. The method of claim 1 in which the fiber is drawn in a reactive atmosphere with respect to the heated charge in order to alter the composition of the charge along its surface, thereby altering the refractive index of the surface of the preform.

7. The method of claim 1 in which the glass fiber consists essentially of an inorganic oxide and in which the fiber is drawn in an oxygen-containing atmosphere.

8. The method of claim 1 in which the preform includes at least two concentric bodies of differing refractive index.

9. The method of claim 8 in which the said at least two concentric bodies comprise a rod within a tube.

10. The method of claim 9 in which the bodies are non-contiguous and in which the atmosphere between the outer surface of the rod and the inner surface of the tube is evacuated, thereby reducing the possibility of gas bubble formation along the clad interface.

11. The method of claim 8 in which the said at least two concentric bodies both include silica and in which the outer body has a lower index of refraction than the inner body.

12. The method of claim 1 in which the preform consists essentially of a silica-base glass.

13. The method of claim 12 in which the preform consists essentially of material selected from the group consisting of pure silica, doped silica, borosilicate compositions, and soda-lime-silica compositions.

* * * * *